United States Patent [19]

Moehle et al.

[11] 4,033,542

[45] July 5, 1977

[54] DUAL SPRING SUPPORT

[75] Inventors: Kenneth Albert Moehle; Raymond George Taschner, both of Racine, Wis.

[73] Assignee: J. I. Case Company, Racine, Wis.

[22] Filed: Aug. 11, 1976

[21] Appl. No.: 713,518

[52] U.S. Cl. .................. 248/358 AA; 267/34; 296/35 R
[51] Int. Cl.² .................. B62A 33/06; B62A 39/00
[58] Field of Search .................. 248/15, 18, 20, 21, 248/22, 24, 358 AA; 267/171, 151, 34; 296/35 R; 180/89 A, 89 R

[56] References Cited

UNITED STATES PATENTS

| | | | |
|---|---|---|---|
| 1,423,904 | 7/1922 | Blyburg | 267/34 |
| 1,838,802 | 12/1931 | Bischof | 267/34 X |
| 2,359,917 | 10/1944 | Hussman | 267/34 X |
| 2,841,388 | 7/1958 | Hehn | 248/358 AA X |
| 2,876,979 | 3/1959 | Barbera | 248/358 AA |
| 2,982,510 | 5/1961 | Curriston et al. | 248/358 AA |
| 3,603,610 | 9/1971 | Thompson | 267/34 |
| 3,797,874 | 3/1974 | Tufano | 267/34 X |
| 3,847,244 | 11/1974 | Fairbanks | 296/35 R X |
| 3,954,255 | 5/1976 | Keijzer | 267/34 |
| 3,966,009 | 6/1976 | Meacock et al. | 296/35 R X |

*Primary Examiner*—J. Franklin Foss
*Attorney, Agent, or Firm*—Arthur J. Hansmann

[57] ABSTRACT

A dual spring support for particular use in supporting a vehicle or tractor cab or the like, and specifically including two co-axially disposed springs extending intermediate two spaced-apart vehicle members which are to be cushion supported relative to each other. An abutment piece is disposed between two ends of the two springs, and abutment surfaces are disposed at the other two ends of the two springs, all so that the springs are opposing in their forces and increase the force at each end of the stroke. Also a shock absorber is shown incorporated in the assembled support.

1 Claim, 1 Drawing Figure

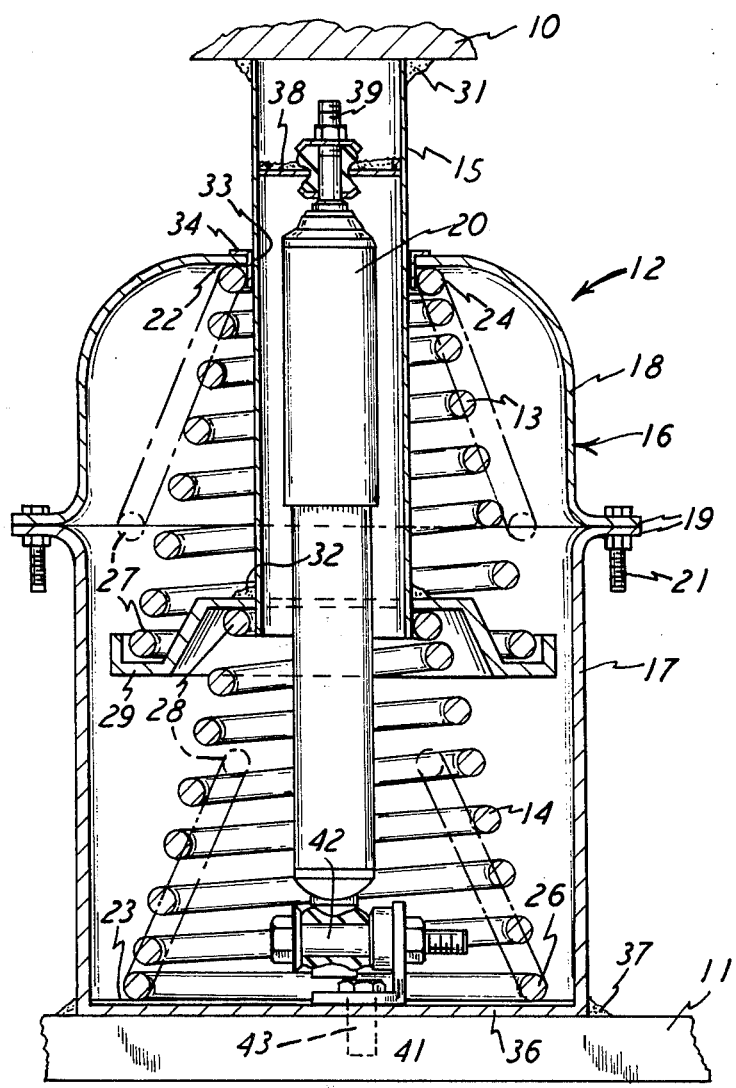

DUAL SPRING SUPPORT

This invention relates to a dual spring support, and, more particularly, it relates to a spring support for a vehicle, such as a tractor cab, and it cushion supports the cab on the vehicle chassis.

BACKGROUND OF THE INVENTION

The prior art is already aware of a variety of arrangements for cushion, resilient, and otherwise spring-supporting vehicle cabs or bodies, railroad and truck beds, and the like. The prior art arrangements are also known to have a combination of hydraulically-operative shock absorbers with compression springs, and such are commonly used on present-day automobiles, for instance. That is, the prior art utilized resilient members, particularly compression springs, in conjunction with conventional shock absorbers, for isolating or suspending the vehicle operator from the remainder of the vehicle, and the reasons for such include dampening vibration and noise, and avoiding fatigue, and for safety reasons. For instance, prior art systems utilizing only singularly disposed compression springs are found in U.S. Pat. Nos. 1,888,989 and 3,067,437 and 3,420,568 and 3,732,941. Also, U.S. Pat. 3,285,652 show a spring suspension system for an operator's sleeping accommodations carried in a vehicle. Finally, U.S. Pat. No. 3,357,717 shows an arrangement of a spring mounting for an operator's seat in a vehicle, such as a tractor, and it is also noted that this patent shows the use of a combination of a compression spring and a shock absorber disposed co-axially with the compression spring.

In the aforesaid, it is a common occurrence and arrangement to have the cushion or spring support effective so that it will cushion basically in one direction such that the cushioning force is increased in that one direction, but, when the externally-applied impact or force is effective in the other direction, then the suspension means is not fully capable of dampening or resisting that force. Accordingly, it is an object of the present invention to provide a spring support which is effective in both directions along the axis of the spring and where actually the dampening or resistance provided by the spring system increases at the end of each stroke in the two directions mentioned. In accomplishing this objective, the present invention utilizes two co-axially disposed springs which are arranged in their mounting and connection to actually oppose each other and to thereby give the spring or dampening effect in both directions, as mentioned. Also, in accomplishing this objective, the spring force is variable, as desired, and therefore is responsible according to the degree of impact or bounce which is externally applied to the system and which is what the system is resisting. Still further, the spring system of this invention is arranged so that it can be conveniently and easily preloaded to have a firm type of mounting between two pieces wherein the damping of vibration is to occur, and thus the springs can be readily and easily preloaded for optimum suspension between the two members of the vehicle or the like.

Still further, the present invention provides a dual spring support which accomplishes the aforementioned objectives and which does so with a very compact arrangement of the system and with the utilization of basically standard components of two springs and enclosing and supportive members or pieces or the like. In accomplishing these objectives, the spring support of this invention is readily and easily provided, is inexpensive, it is compact and therefore occupies only a minimum of space and still permits the respective spring-support members to be appropriately positioned relative to each other, and the entire system results in an improved dampening of vibration, dampening of noise, and a safer type of suspension for vehicles and the like. Also, the usual and well known type of rebound action, created by the normal impact of movement of a vehicle over the ground, are dampened and thus diminished, and the entire system is well within the standards for isolation and rebound in the installations and systems memtioned herein. Other objects advantages will become apparent upon reading the following description in light of the accompanying drawings.

BRIEF DESCRIPTION OF THE DRAWINGS

FIG. 1 is a vertical sectional view through a preferred embodiment of this invention.

DETAILED DESCRIPTION OF THE PREFERRED EMBODIMENT

The drawings shows two spaced-apart members 10 and 11, and these may be the floor of a vehicle cab and the vehicle frame, respectively, and the vehicle may be a tractor or the like, and the members 10 and 11 are conventional members between which the spring or cushioned support, generally designated 12, is disposed and operative. The assembly 12 is shown to generally include two compression springs 13 and 14 and an enclosure 16 and a tubular connector 15 and a shock absorber 20.

The springs 13 and 14 are conical springs which are co-axially disposed, as shown, and they are contained within the enclosure 16 which consists of a lower encircling piece 17 and an upper dome or encircling piece 18, and the two pieces have flanges 19 and are secured together by elongated bolts 21. The container 16 actually presents an upper abutment surface 22 and a lower abutment surface 23 for the two springs 13 and 14, as shown. Thus, the upper spring 13 has its upper end 24 in abutting contact with the surface 22, and the lower springs 14 has its lower end 26 in abutting contact with the surface 23, and thus these two spring ends 24 and 26 are retained in a fixed spacing or distance therebetween. The other respective spring ends 27 and 28 are in abutment with a plate-shaped abutment piece 29, and thus the spring ends 27 and 28 are in constant with the upper and lower surfaces, respectively, of the abutment piece 29. Still further, it will be noticed that the springs 13 and 14 are slightly nested together, to the extend that the lower spring upper end 28 is disposed within the circular confines of the lower end 27 of the upper spring 13, and, when the springs are further compressed, then there can be repositioning of the spring ends such that the end 27 can move to the dot-dash position indicated, and the spring end 28 can also move to its relative dot-dash positon, as shown. That is, the spring ends 24 and 26 do not move relative to each other, but the adjacent springs ends 27 and 28 do move, such as to the dot-dash positions described and shown.

The tubular piece 27 is extended co-axial with the springs 13 and 14 and is connected to the upper member 10, such as by the welding designated 31. The lower end of the tubular piece 15 is connected to the plate 29, such as by the welding 32. Thus the plate 29 is fixedly spaced from the one member 10, However, the enclosure 16 has an opening 33 encircling the tubular member 15, and it has a circular collar 34 defining the opening 33 and interposed between the tubular member 15 and the upper portion 18 of the enclosure 16. Thus, the tubular member 15 can slide up and down in the collar 34 and thus relative to the enclosure 16, and this occurs of course when the members 10 and 11 move toward and away from each other in the manner in which they are capable of doing, by virtue of the spring suspension shown and being described herein. Also, the bottom 36 of the enclosure 16 is affixed to the lower member 11, such as by the welding 37.

Accordingly, it will be seen and understood that the springs 13 and 14 are confined in the member 16 which is assembled and positioned, by virtue of the plurality of bolts 21 extending therearound, and the arrangement is such that the springs 13 and 14 are preloaded by being compressed in the member 16 through tightening of the bolts 21 which are elogated, as shown. With this arrangement, the springs 13 and 14 oppose each other, and the force is such that they increase the force between the members 10 and 11, in both directions of movements of the members 10 and 11 toward and away from each other, as will be seen and understood upon contemplation of the arrangement shown in FIG. 1.

That is, considering an upward force on the vehicle frame member of chassis 11, such as by encountering a bump in the road, the member 11 will tend to rise or move toward the member 10, and the spring 14 will resist that force by virtue of the compressive characteristic of the spring 14. In that action, the container 16 will also move toward the member 10, and thus the spring 13 will extend somewhat since its abutment surface 22 will move upwardly. The amount of movement of the member 11 toward the member 10 will determine the total force in the spring 14 to resist that movement, and that resisting force will be in proportion to the movement, as desired to effect the desired dampening of the impact. Conversely, if the member 11 were to move downwardly, such as by having the vehicle encounter a hole in the road, or in any other action, including rebound, which would cause the members 10 and 11 to move away from each other, then the enclosure 16 and the piece 29 would force inwardly on the spring 13 to compress the latter and to have the spring 13 resist the separating force being described.

Accordingly, movement of the member 10 and 11 either toward or away from each other results in a variable and opposing force, in accordance with the amount of impact or force acting on the members 10 and 11, and in both directions of movement of the members 10 and 11 toward and away from each other.

Further, it will be seen that the conventional type of shock absorber 20 is connected with the member 15, such as through the affixed plate 38 and the shock absorber threaded end 39 and through the affixed angled plate 41 and the shock absorber usual bolt 42. The plate 41 and the enclosure 16 may be held to the frame 11 by a bolt 43. Of course it will be seen that the shock absorber 20 is co-axial with the tubular member 15 and with the two springs 13 and 14, and the shock absorber is available for serving the usual purpose of absorbing immediate and violent shocks commonly encountered in the operation of a vehicle.

Futher, the springs 13 and 14 are preferably of equal strength, and, as mentioned, they may be preloaded and are of variable spring characteristics to increased resistance in accordance with the overall length of each spring. Also, the abutment 29 is shown located at the mid-plane of the enclosure 16, that is, half way between the abutting surfaces 22 and 23.

What is claimed is:

1. A dual spring and shock absorber support assembly, comprising two spaced-apart members which are movable toward and away from each other, a tubular connector being affixed to one of said two members and extending toward and spaced from the other of said members, an enclosure affixed to said other of said members and extending toward and spaced from said one of said members and aligned with and surrounding and extending end of said tubular connector and having two parallel and spaced-apart abutment surfaces, an abutment piece affixed to and surrounding the extending end of said tubular connector and located within said enclosure half way between said abutment surfaces and extending parallel to said abutment surfaces, and being spaced from said enclosure to be freely movable therewithin, two compression coil springs of equal strength co-axially disposed in end-to-end relation respectively between said abutment piece and said abutment surfaces and co-axial with the longitudinal axis of said tubular connector for dampening the movement of said members in both the toward and away directions, and a shock absorber extending in said tubular connector and co-axial with said two springs and being operatively connected at its respective ends with said two members for dampening shocks imposed upon said two members.

* * * * *

UNITED STATES PATENT OFFICE
CERTIFICATE OF CORRECTION

PATENT NO. : 4,033,542

DATED : July 5, 1977

INVENTOR(S) : Kenneth Albert Moehle
Raymond George Taschner

It is certified that error appears in the above-identified patent and that said Letters Patent are hereby corrected as shown below:

Claim 1, line 9, "and", first occurrence, should read -- the --.

Signed and Sealed this

Twenty-seventh Day of September 1977

[SEAL]

Attest:

RUTH C. MASON
Attesting Officer

LUTRELLE F. PARKER
Acting Commissioner of Patents and Trademarks